Jan. 19, 1937. L. L. KRAMER 2,068,295
STROLLER
Filed Nov. 26, 1935  2 Sheets-Sheet 1
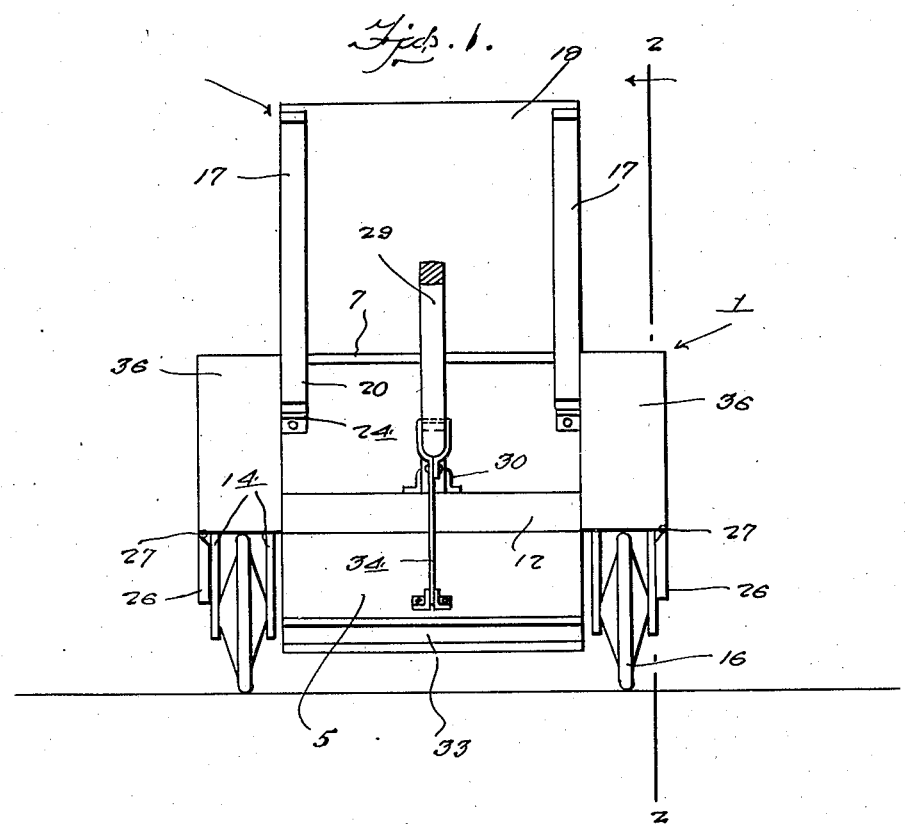
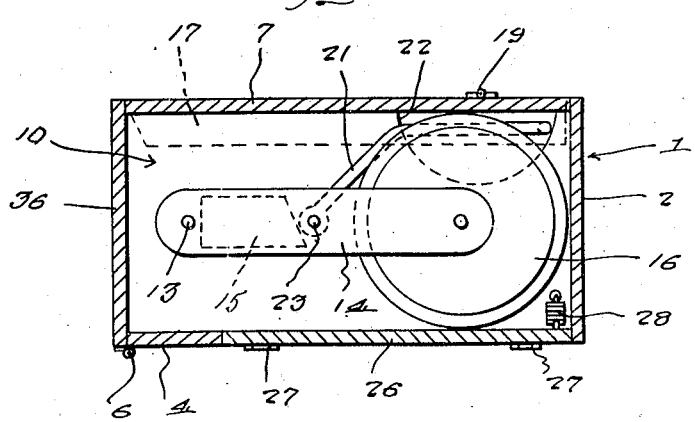
Inventor
L. L. Kramer
By Clarence A. O'Brien
Attorney Jan. 19, 1937. L. L. KRAMER 2,068,295
STROLLER
Filed Nov. 26, 1935 2 Sheets-Sheet 2

Inventor
L. L. Kramer
By Clarence A. O'Brien
Attorney

Patented Jan. 19, 1937

2,068,295

UNITED STATES PATENT OFFICE 2,068,295

STROLLER

Lyle L. Kramer, Golconda, Nev.

Application November 26, 1935, Serial No. 51,675

1 Claim. (Cl. 280—37)

The present invention relates to new and useful improvements in baby strollers and has for its primary object to provide, in a manner as hereinafter set forth, a device of this character embodying a novel construction, combination and arrangement of parts through the medium of which the same may be expeditiously folded when not in use, as when it is desired to transport it, or unfolded.

Other objects of the invention are to provide a stroller of the aforementioned character which will be simple in construction, strong, durable, efficient and reliable in use, light in weight, compact, attractive in appearance, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in front elevation of a stroller constructed in accordance with the present invention, showing the same unfolded for use.

Figure 1 is a view in bottom plan of the stroller, with a portion of the bottom of the body broken away to expose one of the supporting wheels in retracted position.

Figure 4 is a vertical sectional view through one end portion of the stroller in folded position.

Figure 2:
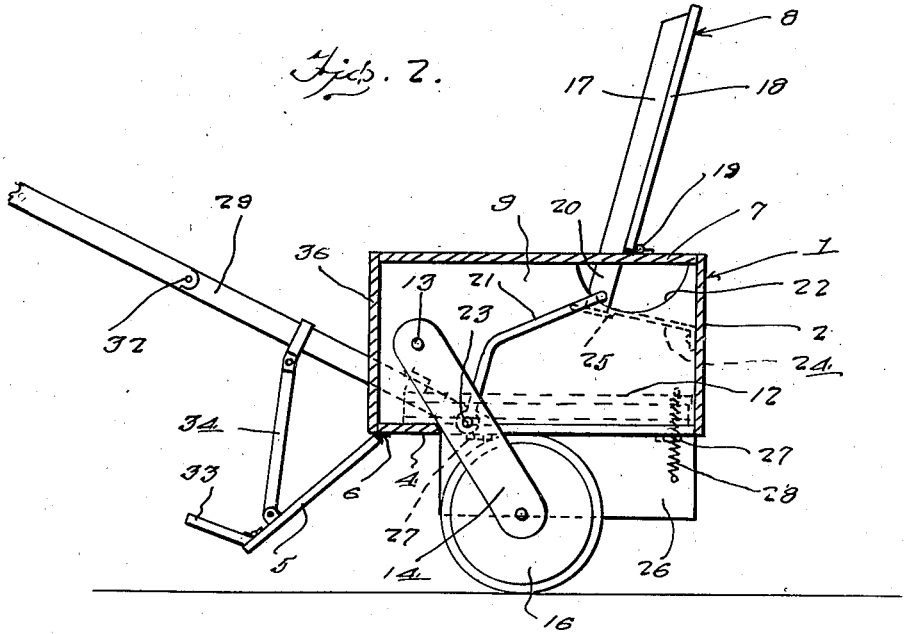
Figure 2 is a view in vertical section, taken substantially on the line 2—2 of Figure 1.

Referring now to the drawings in detail, it will be seen that the embodiment of the invention which has been illustrated comprises a body which is designated generally by the reference numeral 1, said body being substantially rectangular in plan and formed of any suitable material. The body 1 includes a front 2, sides 3, a bottom 4, and a rear 5 which is hingedly mounted, as at 6, on the bottom 4. The body 1 further includes a top 7 having an opening therein in which a back rest designated generally by the reference numeral 8 is operable.

Spaced from the sides 3 of the body 1 are partitions 9 which divide said body into wheel compartments 10 and a passenger compartment 11. A seat structure 12 is provided in the passenger compartment 11 of the body. Pins 13 traverse the wheel compartments 10 and have mounted thereon pairs of spaced, opposed arms 14 which are rigidly secured together, as by a connecting block 15. Journaled between the free end portions of the pairs of arms 14 are supporting wheels 16. The back rest 8 includes a pair of bars 17 which are mounted on a panel 18 in a manner to provide free end portions constituting arms projecting into the body 1. The back rest 8 is hingedly connected, as at 19, on the body 1. The aforementioned arms are designated by the reference numeral 20. Angular links 21 operatively connect the wheel supporting arms 14 to the back rest 8 for actuation thereby, said links being pivotally connected with the arms 20 through substantially semi-circular openings 22 which are provided therefor in the adjacent upper portions of the partitions 9. The other ends of the links 21 are journaled on pins 23 extending between intermediate portions of the pairs of arms 14.

Resilient latches 24 extend rearwardly from the front wall 2 of the body 1 for releasably securing the back rest 8 in raised position, as suggested in Figure 2 of the drawings. The free ends of the arms 20 ride on the latches 24 which are formed to provide shoulders 25 for abutting engagement with said arms for preventing swinging movement of the back rest toward closed position. The wheel compartments 10 are provided with hinged bottom doors 26, said doors being hinged, as at 27, on the sides 3 of the body 1. Coil springs 28 are connected to the doors 26 for yieldingly urging said doors toward closed position at all times.

Figure 3:
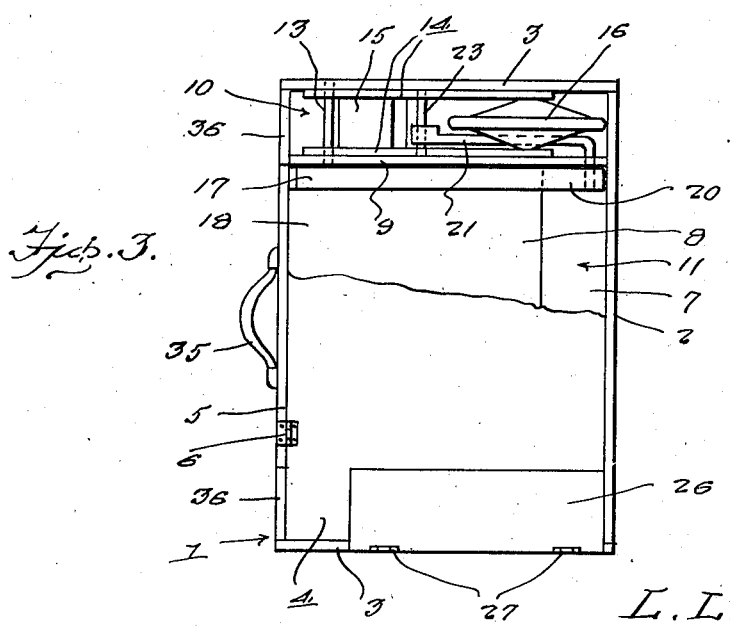

The reference numeral 29 designates a detachable and foldable tongue which is connectible, as at 30, to the body 1. The seat structure 12 is provided with a socket which receives one end portion of the tongue 29 and said seat structure is further provided with a substantially U-shaped bracket in which the tongue is engageable, as best seen in Figure 1 of the drawings. The tongue 29 comprises a plurality of sections which are hingedly connected together, as at 32. A foot rest 33 is hingedly mounted on the free end portion of the swinging rear wall 5 of the body 1. It will be noted that the swinging rear wall 5 of the body 1 terminates at the partitions 9, as best seen in Figure 3 of the drawings. Any suitable means may be provided for securing the rear wall 5 in closed position. A hanger 34 is hingedly mounted on the swinging rear wall 5 and is detachably connectible with the tongue 29 for supporting said rear wall in an inclined open position when the stroller is in use. Also mounted on the rear wall 5 is a carrying handle 35.

In use, when the back rest 8 is swung to open position, the links 21 swing the wheels 16 downwardly out of the compartments 10, said wheels swinging the doors 26 to open position against the tension of the coil springs 28. When the free ends of the arms 20 move past the shoulders 25 of the resilient latches 24, said latches snap into operative engagement with said arms for releasably securing the back rest in raised or operative position. The wall 5 of the body is swung to open position, as is also the foot rest 33 on said wall 5. The sectional tongue 29, which may be stored in the body 1, is mounted in position and the brace 34 connected thereto. The device is then ready for use. To fold the stroller, the brace 34 is disconnected from the tongue 29 and the said tongue is removed, folded and placed in the body 1. The member 5 is then swung to closed position and the latches 24 are depressed to release the back rest 8 which is swung to folded position, this movement of the back rest raising the wheels 16 to retracted or inoperative position in the compartments 10. As the wheels enter the compartments 10, the coil springs 28 close the doors 26. Any suitable means may be provided for latching the back rest 8 in closed position. When folded, the body 1 is substantially in the form of a suitcase which may be conveniently carried through the medium of the handle 35. If desired, the body 1 may be attractively painted or provided with a suitable covering. The rear ends of the wheel compartments 10 are closed by stationary wall sections 36.

It is believed that the many advantages of a stroller constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:

A foldable stroller comprising a body, retractible supporting wheels mounted for swinging movement on the body, a back rest pivotally mounted on the body for movement to operative or inoperative position, means operatively connecting the wheels to the back rest for actuation thereby to operative or inoperative position, said back rest including a pair of arms projecting into the body, and resilient latches mounted in the body and engageable with the free ends of the arms for releasably securing the back rest in operative position, said resilient latches including retaining shoulders for abutting engagement with said arms.

LYLE L. KRAMER.